United States Patent Office 3,529,065
Patented Sept. 15, 1970

3,529,065
PROCESS FOR MAKING DRY
VITAMIN A MATERIAL
Herbert W. Flandreau, Jr., Waterford, Conn., assignor to Chas. Pfizer & Co., Inc., New York, N.Y., a corporation of Delaware
No Drawing. Filed May 2, 1967, Ser. No. 635,354
Int. Cl. A61k 15/02
U.S. Cl. 424—344                    4 Claims

ABSTRACT OF THE DISCLOSURE

An improved process for making dry, free-flowing compositions containing vitamin A material which comprises freezing a dispersion of vitamin A material in a solution of a water-soluble gelable colloid, cold-milling the frozen dispersion and then drying the milled dispersion to a desired water content.

BACKGROUND OF THE INVENTION

This invention relates to an improved process for making dry, free-flowing compositions containing vitamin A material, such compositions being useful as such or for the formulation of pharmaceutical dosage forms or for the preparation of animal feeds.

Dry compositions containing vitamin A material are of value as dietary supplements for human and animal use. Suitable compositions must be characterized by high stability and high potency, must be free-flowing and, particularly as regards animal feeds, easily blendable into non-stratifying blends.

Prior art efforts to fulfill these requirements have produced solid compositions of vitamin A incorporated into fine particles as beadlets of gelatin or similar gelable colloids such as are described in U.S. Pats. 2,183,053; 2,183,084; 2,218,592; and 2,643,209. U.S. Pat. 2,689,202 describes dry vitamin A compositions produced by drying sheets or continuous films of vitamin A dispersed in a solution of a water-soluble gelable colloid, freezing said sheets or films and then comminuting the frozen sheets or films in an inert atmosphere.

The prior art compositions have, however, been deficient in one or more of the above-mentioned characteristics. The compositions of U.S. 2,689,202 for example are produced by a process which is essentially a variation of the improved process of this invention. Yet said compositions are of much poorer stability than the compositions of the present invention.

SUMMARY OF THE INVENTION

There has now been found an improved process for making dry, free-flowing compositions containing vitamin A material, said compositions being characterized by improved stability and high potency, which comprises: freezing a dispersion of vitamin A material in a solution of a water-soluble gelable colloid, cold-milling the said frozen dispersion and then drying the milled product.

Broadly speaking, this improved process involves preparation of a dispersion or emulsion of vitamin A material in a solution of a water-soluble gelable colloid by any desired means. Suitable water-soluble, gelable colloids are gelatin, gum acacia, pectin, tragacanth and the like. The preferred water-soluble gelable colloid for the purpose of this invention is gelatin.

The relative proportions of the various ingredients of such dispersions and general methods for preparing the same are set forth in the aforementioned U.S. patents. It is preferred to add a sugar-like material such as glucose, molasses, corn syrup or honey to the dispersion or emulsion to assist in plasticizing the dried product. Additionally, various stabilizers such as sodium citrate, sodium erythrobate and sodium bisulfite can be added to the dispersion. Anti-foaming agents can be added if desired to minimize foaming of the dispersion during its preparation. However, such agents are usually not necessary.

By "vitamin A material" is meant vitamin A and vitamin A active esters whether prepared synthetically or obtained from natural sources. Representative of such esters are the following: acetate, propionate, butyrate, palmitate, $\alpha,\alpha$-dimethyl palmitate, $\alpha$-methyl-$\alpha$-ethyl caproate, $\beta$ - naphthoate, anthraquinone $\beta$ - carboxylate, $\alpha$-phenylazobenzoate and like esters. The preferred esters for the present process are the acetate and the palmitate.

The dispersion or emulsion-containing vitamin A material is then frozen. The dispersion need not be quick frozen but may be chilled first and then frozen rapidly. Rapid freezing of the chilled dispersion or quick freezing of the original dispersion is desirable in order to maintain the properties of the dispersion. Slow freezing may result in breakdown of the dispersion.

The step of freezing the dispersion must be carried out by means of a cooling agent that will not appreciably dissolve or react with the ingredients of the dispersion. Solid carbon dioxide and liquid nitrogen are especially useful for this purpose. Temperatures of between $-10°$ C. and $-70°$ C. are desirable for freezing. A temperature of about $-30°$ C. is usually preferred. If the dispersion is to be chilled prior to freezing, chilling may be conveniently accomplished by the use of cold brine.

The entire mass of the frozen dispersion is fed into a suitable pre-cooled pulverizing or grinding mill to obtain the desired screen size. Alternatively, the material may be milled in liquid nitrogen. A variety of mechanical grinding apparatus known in the engineering trade can be employed such as hammermills, pulverizers, cold operated roller mills.

The milled product is then dried by suitable means. It is generally preferred to vacuum-dry the milled product to a water content of from about two to seven percent. Alternatively, the milled product may be air-dried. In either case, the temperature of drying should be below the point at which the product loses its brittleness.

The dried product may, if desired, be washed with a suitable solvent to remove any vitamin A material which may be present on the surface of the particles. The solvent, of course, should be one which does not materially dissolve the product nor react therewith. Suitable solvents are the lower alcohols such as methanol, ethanol and isopropanol, diethyl ether, and lower ketones such as acetone, methyl isobutyl ketone, etc.

The product produced by the herein described process consists of a chip-like particle rather than a round particle. Because of this, it is easy to handle and readily blendable into non-stratifying blends. Additionally, the product contains a relatively small proportion of vitamin A material on the surface of the chip relative to that obtained by the prior art methods, including the process of U.S. Pat. 2,689,202. This is readily demonstrated by extracting the products with hexane.

DETAILED DESCRIPTION OF THE INVENTION

The improved process of this invention is conveniently carried out by first gelling the dispersion of vitamin A material, cutting it into suitable blocks or squares, e.g. one to four inch squares, and then contacting the blocks or squares with milled solid carbon dioxide in a suitable apparatus, e.g. by tumbling in a drum. The use of milled solid carbon dioxide is, of course, highly desirable in order to present a large surface to expedite the freezing step. The entire mass of frozen dispersion and solid carbon dioxide is then introduced into a suitable precooled grinding or pulverizing mill to obtain the desired particle size.

Alternatively, the freezing of the dispersion can be accomplished in a continuous process by pouring the dispersion at a temperature at which it is liquid (e.g. 60°–70° C.) onto an endless belt upon which it is frozen as by passage through an insulated tunnel where liquid nitrogen is sprayed upon it.

It is desirable but not necessary to prepare the dispersion under a blanket of inert gas such as carbon dioxide or nitrogen, and to use boiled (air free) water. Once the dispersion has been frozen there is no need to conduct subsequent process steps in an inert atmosphere.

While there appear to be no critical levels of ingredients necessary for making the dispersion of vitamin A material, certain ranges or proportions of the various ingredients are more suitable than others for the purpose of this invention. The proportion (by weight) of corn syrup or other suitable plasticizer of similar water content to gelatin or other suitable water-soluble gelable colloid is desirably from about 0.4:1 to about 1.5:1. The proportion of about 0.8:1 appears to be optimum when using corn syrup as plasticizer. The proportion of weight of water to water-soluble gelable colloid, e.g. gelatin, should advantageously be from about 1.5:1 to about 2.5:1. The lower limit of this range appears especially suitable in this process. The ratio of vitamin A material to the total weight of the solid ingredients can be as high as 0.40:1 and should be at least about 0.20:1. Lower proportions can, of course, be used but since a feature and advantage of the present invention is production of a high potency product, the aforementioned range is preferred.

The frozen dispersion is milled at a temperature sufficiently low to maintain the dispersion in the frozen state. Temperatures of from about −10° C. to about −70° C. are useful. A temperature of about −30° C. is especially useful.

The milled product is then dried by appropriate methods as mentioned above to a water content of from about 2% to about 7%.

The process of this invention affords a dry, free-flowing composition characterized by unexpectedly improved stability over the compositions obtainable by the prior art methods. The reversal of the drying step to the end of the process rather than at the beginning of the process as is done in U.S. 2,689,202 has been found to minimize the amount of vitamin A material in the surface of the final product leading to improved stability of the composition.

The following examples are given by way of illustration and are not intended as limitations of this invention, many variations of which are possible within the scope and spirit thereof.

Example I

To a solution of sodium bisulfite (140 gms.) in water (100 kg.) at 60° C., there is added glucose (49.5 kg.), sodium citrate (1.38 kg.) and sodium erythrobate (2.76 kg.). The solution is stirred for ten minutes at 60° C. Gelatin (32 kg., U.S.P., 150 bloom) and sodium bisulfite (140 gms.) are then added and the mixture stirred at 60° C. for one-half hour, then purged with nitrogen. Vitamin A palmitate (47 kg.) is added and the dispersion stirred at 61°–63° C. for one-half hour. Gelatin (32 kg., U.S.P., 150 bloom) is added and the dispersion stirred for another half hour at 61°–63° C.

(A) The dispersion is divided into two equal portions (A and B). The first portion (A) is gelled, then cut into two-inch squares and frozen by tumbling with milled solid carbon dioxide in a drum. The frozen dispersion is fed into a hammermill precooled to −30° C. by the addition of solid carbon dioxide and milled to a particle size averaging between 20 and 100 mesh (U.S. screen size). The milled frozen dispersion is then vacuum-dried to a water content of 5% (approximate).

(B) The second portion (B) is worked up according to the procedure of Example I of U.S. 2,689,202. The dispersion is poured on to an aluminum tray (lubricated with a silicone oil to minimize sticking) of such dimensions that a uniform film of about ¼ inch is formed. The mixture is allowed to gel and is then dried for 24 hours in a warm room until quite brittle. The brittle sheet is cut into one-inch squares which are dried for an additional 36 hours. The diced chips are placed in a cylindrical vessel, milled solid carbon dioxide (20 kg.) added and the mixture agitated until the chips are completely frozen. The frozen chips plus Dry Ice are then milled in a hammermill precooled to −30° C. by the addition of solid carbon dioxide and milled to a particle size averaging between 20 and 100 mesh (U.S. screen size). The milled product is directly introduced into a mixture of isopropanol and solid carbon dioxide at −50° C., filtered and dried at room temperature.

The two batches of dry vitamin A palmitate are compared for stability and extractability of the vitamin A palmitate by hexane.

|  | Batch A | Batch B |
| --- | --- | --- |
| Initial Potency (USP), mμ/gm | 0.367 | 0.370 |
| Percent volatile ¹ (water) | 3.8 | 5.4 |
| Hexane extractable, percent | 5.4 | 11.4 |
| Percent loss, 7 days at 56° C | 5 | 8 |
| Percent loss, 14 days at 56° C | 7 | 12 |

¹ Determined by drying at 100° C. for two hours.

Example II

Two additional batches of dry vitamin A palmitate are produced by the procedure of Example I. Pertinent data on the products obtained are given below.

|  | A-1 | B-1 | A-2 | B-2 |
| --- | --- | --- | --- | --- |
| Initial Potency (USP), mμ/gm | 0.358 | 0.367 | 0.355 | 0.388 |
| Percent volatile (water) | 2.2 | 3.7 | 4.5 | 3.9 |
| Hexane extractable, percent | 5.5 | 7.3 | 9.8 | 22.8 |
| Percent loss, 7 days at 56° C | 6 | 7 | 8 | 11 |
| Percent loss, 14 days at 56° C | 17 | 22 | 22 | 26 |

In each instance the process of this invention provides a product of improved quality.

Example III

Dispersions of vitamin A palmitate gelatin are produced as described in Example I. However, each of the dispersions is divided into two equal portions and treated as follows. Portion A is frozen on a continuous process by pouring the liquid dispersion onto an endless belt which passes through a tunnel where liquid nitrogen is sprayed upon it. The frozen material is then milled as described in Example I(A).

The second portion (B) is dried as described in Example I and the dry chips frozen in the above manner. The frozen chips are then milled according to the procedure of Example I(B).

Pertinent comparative data on the products are provided below. The average water content of these products is 4.1%.

|  | A-1 | B-1 | A-2 | B-2 | A-3 | B-2 |
| --- | --- | --- | --- | --- | --- | --- |
| Initial Potency (USP), mμ/gm | 0.388 | 0.355 | 0.358 | 0.367 | 0.367 | 0.370 |
| Hexane extractable, percent | 9 | 23 | 5.6 | 7.4 | 5.4 | 11.6 |
| Percent loss, 7 days at 56° C | 4 | 11 | 6 | 7 | 5 | 8 |
| Percent loss, 14 days at 56° C | 12 | 21 | 8 | 10 | 7 | 12 |

The product of the present process is thus of improved stability.

Example IV

Repetition of the procedures of Example I but using vitamin A acetate, butyrate, α,α-dimethylpalmitate and α-methyl-α-ethyl caproate in place of vitamin A palmitate produces dry compositions of improved stability relative to those obtained by prior methods.

What is claimed is:

1. In the process for making a dry composition containing vitamin A material by drying a dispersion of vitamin A material in an aqueous solution of a water-soluble gelable colloid, the improvement which comprises first freezing said aqueous dispersion by means of solid carbon dioxide, cold-milling the frozen dispersion and then drying the milled product to a water content of from about 2% to about 7%.

2. The process of claim 1 where the vitamin A material is vitamin A palmitate.

3. In the process for making a dry composition containing vitamin A material by drying a dispersion of vitamin A material in an aqueous solution of a water-soluble gelable colloid, the improvement which comprises first freezing said aqueous dispersion by means of liquid nitrogen, cold-milling the frozen dispersion and then drying the milled product to a water content of from about 2% to about 7%.

4. The process of claim 3 where the vitamin A material is vitamin A palmitate.

References Cited

UNITED STATES PATENTS 2,689,202  9/1954  Bavley et al. _____ 424—344

RICHARD L. HUFF, Primary Examiner